(12) United States Patent
Venkatapadmanaabhan

(10) Patent No.: US 8,675,494 B2
(45) Date of Patent: Mar. 18, 2014

(54) CONFLICT IDENTIFICATION IN LABEL SWITCHED SERVICES

(75) Inventor: Balasubrahmanyam Venkatapadmanaabhan, Santa Clara, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 530 days.

(21) Appl. No.: 12/631,559

(22) Filed: Dec. 4, 2009

(65) Prior Publication Data

US 2011/0134764 A1 Jun. 9, 2011

(51) Int. Cl.
*H04L 12/28* (2006.01)

(52) U.S. Cl.
USPC ........................................... 370/241

(58) Field of Classification Search
USPC ......... 370/241–245, 248, 250, 254, 351, 389, 370/400; 709/223, 224, 227–229, 238, 244
See application file for complete search history.

(56) References Cited

U.S. PATENT DOCUMENTS

| | | | |
|---|---|---|---|
| 6,789,121 B2 * | 9/2004 | Lamberton et al. ........... 709/227 |
| 6,879,594 B1 | 4/2005 | Lee et al. | |
| 6,894,972 B1 | 5/2005 | Phaal | |
| 7,245,587 B2 | 7/2007 | Phaal | |
| 7,260,097 B2 | 8/2007 | Casey | |
| 7,336,648 B1 | 2/2008 | Sasagawa | |
| 7,340,519 B1 | 3/2008 | Golan et al. | |
| 7,486,622 B2 * | 2/2009 | Regan et al. .................. 370/236 |
| 7,535,856 B2 * | 5/2009 | Booth et al. .................. 370/255 |
| 7,764,702 B2 * | 7/2010 | Yang et al. .................... 370/409 |
| 7,778,199 B2 * | 8/2010 | Booth et al. .................. 370/254 |
| 7,804,766 B2 * | 9/2010 | Qian et al. .................... 370/216 |
| 7,804,781 B2 * | 9/2010 | Xu et al. ........................ 370/242 |
| 7,856,599 B2 * | 12/2010 | Proulx et al. .................. 715/737 |
| 7,962,592 B2 * | 6/2011 | Nagami ......................... 709/223 |
| 8,059,527 B2 * | 11/2011 | Townsley et al. ............. 370/225 |
| 8,065,660 B1 * | 11/2011 | Tanner et al. ................. 717/121 |
| 8,098,649 B2 * | 1/2012 | Regan et al. .................. 370/351 |
| 2002/0110087 A1 | 8/2002 | Zelig et al. | |
| 2003/0145069 A1* | 7/2003 | Lau et al. ...................... 709/220 |
| 2010/0284302 A1* | 11/2010 | Proulx et al. .................. 370/254 |

OTHER PUBLICATIONS

"Virtual Leased Line," from Wikipedia, the free encyclopedia, http://en.wikipedia.org/wiki/Virtual_Leased_Line, retrieved Oct. 27, 2009, 1 page.

(Continued)

*Primary Examiner* — Dmitry H Levitan
(74) *Attorney, Agent, or Firm* — Shun Yao; Park, Vaughan, Fleming & Dowler LLP

(57) ABSTRACT

Administrative logic is configured to discover routers in a network providing one or more label switched services and evaluate the configuration information of the label switched services to identify conflicts in the label switched services (e.g., configuration information errors). By identifying conflicts for one or more label switched services, the administrative logic generates a notification identifying the conflict and potentially the type of conflict. In particular, in one implementation, the administrative logic can use the configuration information of a first router to identify one or more peer routers of the first router and compare the configuration information in the various routers to identify apparent conflicts. The administrative logic can also communicate commands to the appropriate router to correct the misconfiguration and, in certain circumstances, establish proper communications or otherwise resolve service inconsistencies (e.g., VLL name mismatches).

17 Claims, 12 Drawing Sheets

(56) References Cited

OTHER PUBLICATIONS

Martini et al., "Pseudowire Setup and Maintenance Using the Label Distribution Protocol (LDP)," Network Working Group, Apr. 2006, http://faqs.org/rfcs/rfc4447.html, retrieved Nov. 17, 2009, 26 pages.

Rosen et al., "Multiprotocol Label Switching Architecture," Network Working Group, Jan. 2001, http://www.ietf.org/rfc/rfc2021.txt, 57 pages.

"Multiprotocol Label Switching," from Wikipedia, the free encyclopedia, http://en.wikipedia.org/wiki/Multiprotocol_Label_Switching, retrieved Nov. 19, 2009, 8 pages.

Phaal, et al., "InMon Corporaton's sFlow: A method for Montoring Traffic in Swtched and Routed Networks," Sep. 2001, pp. 1-31.

PHAAL, "sFlow Version 5", Jul. 2004, pp. 1-57.

Enterasys Networks that Know, Data Sheet entitled: "Enterasys Sentinel Trusted Access Manager and Trusted Access Gateway," Lit #9014096, Jan. 2006, pp. 1-4.

Enterasys Networks that Know, Data Sheet entitled: "Dragon 7 Network Intrusion Detection and Prevention," Lit #9013766-4, Jan. 2006, pp. 1-6.

Enterasys Networks that Know, Data Sheet entitled: "Dragon Network Defense," Lit #9014085, Dec. 2005, pp. 1-8.

sFlow-Making the Network Visible—www.sflow.org, Copyright 2003, "Traffic Monitoring using sFlow," 5 pages.

InMon Corp. Internet Monitoring: "sFlow Accuracy and Billing," Copyright 2004, 3 pages.

InMon Corp. Internet Monitoring: "Using sFlow and InMon Traffic Server for Intrusion Detection and other Security Applications," Copyright 2001, 4 pages.

InMon Corp. Internet Monitoring, "Traffic Monitoring in a Switched Environment," Copyright 2001, 7 pages.

"sFlow" from Wikipedia, the free encyclopedia, http://en.wikipedia.org/wiki/SFlow, retrieved Mar. 31, 2010, 2 pages.

Foundry Networks, "IP/MPLS-Based VPNs Layer-3 vs. Layer-2," 2002, http://www/foundrynet.com/pdf/wp-ip-mpls-based-vpns.pdf, retrieved Apr. 1, 2010, 16 pages.

Anritsu, "Must-Have Reference for IP and Next Generation Networking," 2004, http://www.anritsu.com/hk/sc/downloads/files/musthave.pdf, retrieved Apr. 1, 2010, 43 pages.

Foundry Networks, "MPLS Layer-2 Virtual Private Networks Foundry Networks Delivers Ethernet Services over MPLS," 2001, http://content8.wuala.com/contents//rg443/Documents/Foundry_Networks/preso-mpls-12-vpn.pdf?token=1270137890903, retrieved Apr. 1, 2010, 48 pages.

File History for U.S. Appl. No. 11/942,969, filed Nov. 20, 2007, Animesh Chaturvedi et al., entitled "Managing Network Security".

http://en.wikipedia.org/wiki/Virtual_Leased_Line, p. 1 of 1, Oct. 27, 2009.

http://en.wikipedia.org/wiki/Multiprotocol_Label_Switching, 8 pages, Nov. 19, 2009.

E. Rosen et al., Multiprotocol Label Switching Architecture, RFC 3031, Jan. 2001, 57 pages.

L. Martini et al., Pseudowire Setup and Maintenance Using the Label Distribution Protocol, RFC 4447, Apr. 2006, 26 pages.

Foundry Networks, MPLS Layer-2 Virtual Private Networks, 47 pages, 2001.

\* cited by examiner

FIG. 8 Continued

CONFLICT IDENTIFICATION IN LABEL SWITCHED SERVICES

BACKGROUND

Communications networks, including without limitation wide area networks ("WANs") and local area networks ("LANs"), may be implemented as a set of interconnected switches that connect a variety of network-connected nodes to communicate data and/or control packets among the nodes and switches. Various networking protocols may be employed to allow different devices to communicate across and within the network. However, it can be a challenge to provide interoperability between networks and devices operating under different protocols.

One technique for providing such interoperability is called Multiprotocol Label Switching (MPLS), which establishes efficient endpoint-to-endpoint transportation of data over connectionless networks. MPLS is described in detail by Rosen et al., in Requests for Comments (RFC) 3031 of the Internet Engineering Task Force (IETF), entitled "Multiprotocol Label Switching Architecture" (January 2001), which is incorporated herein by reference for all that it discloses and teaches. In MPLS, each packet is assigned to a Forwarding Equivalence Class (FEC) when it enters the network. The FEC is assigned based on the packet's destination address. A packet receives a short, fixed-length label identifying the FEC to which it belongs. All packets in a given FEC are passed through the network over the same path by label-switching routers (LSRs), which simply use the label as an index to a look-up table. The table specifies the next hop on the packet's path for an individual FEC and the label that the LSR attaches to the packet for the next hop. In this manner, the packet is conveyed through the network based on its label field.

Each flow of packets along a virtual circuit (VC) under MPLS is completely specified by the label applied at the ingress node of the network path. A VC represents a tunnel through the network, such as between two provider edge (PE) routers. MPLS tunnels are established by "binding" a particular label, assigned at the ingress node of the network, to a particular FEC. Multiple tunnels may belong to the same FEC, but each tunnel will have its own label binding. One or more ports of each PE router can act as endpoints of the tunnel and connect to customer edge (CE) devices, such as a customer-operated switch or server.

An endpoint-to-endpoint communication through a tunnel can be configured as a virtual leased line (VLL) service to carry bandwidth-guaranteed applications, such as voice, video, and online transaction processing, through the network. In the case of a local-VLL service (at specific type of VLL service), both endpoints can reside on the same router. In such cases, the entire local VLL resides within the router.

In one implementation, a VLL service uses a VC in the tunnel to provide bidirectional communications, and each VLL service is given a unique identifier (ID), called a VLL ID, which is also referred to as a virtual connection ID (VCID). Each router at an end of the VLL service is configured with the VLL ID and the address of the other router of the VLL service, which is called a VLL peer. If a VLL service is improperly configured, then data will not flow properly across the VC (e.g., the VLL modes of the routers do not match) or the network will present confusing information (e.g., a VLL name mismatch between two endpoints of the VLL). Other conflicts may also occur. However, it is difficult to troubleshoot such problems because such conflicts are not easily identified using previous approaches, particularly in large networks.

Furthermore, whereas a VLL service provides an endpoint-to-endpoint tunnel in label switched services, a Virtual Private LAN Segment (VPLS) service provides full mesh connectivity using label switched services. For example, in a network including four provider-edge (PE) routers, a VC is established between each pair of PE routers, resulting in 6 VCs. Each CE device connected to one of the PE routers communicates as though it resides in the same subnet as the other CE devices, regardless of their physical topology. However, configuration conflicts in a VPLS service are also difficult to troubleshoot because such conflicts are not easily identified using previous approaches, particularly in large networks

SUMMARY

Implementations of the presently disclosed technology provides administrative logic configured to discover routers in a network providing one or more label switched services and evaluate the configuration information of the label switched services to identify conflicts in the label switched services (e.g., configuration information errors). By identifying conflicts for one or more label switched services, the administrative logic generates a notification identifying the conflict and potentially the type of conflict. In particular, in one implementation, the administrative logic can use the configuration information of a first router to identify one or more peer routers of the first router and compare the configuration information in the various routers to identify apparent conflicts. The administrative logic can also communicate commands to the appropriate router to correct the misconfiguration and, in certain circumstances, establish proper communications or otherwise resolve service inconsistencies (e.g., VLL name mismatches).

Other implementations are also described and recited herein.

BRIEF DESCRIPTIONS OF THE DRAWINGS

DETAILED DESCRIPTIONS

The presently disclosed technology relates to identifying conflicts in one or more label switched services. When a label switched service is set up, different endpoints of a VLL, local-VLL, or VPLS service can be misconfigured, such that the virtual circuit does not function properly or the configurations present a user with confusing information. For example, a VLL mode provided to a router at one endpoint of a VLL service can be mistyped so that it does not match the VLL mode provided to the endpoint at the other end of the VLL service. Such conflicts may be identified and resolved by querying the endpoints in PERs of a VLL service, detecting differences in the configuration information associated with each endpoint, and correcting the misconfigured information so that the configuration information is consistent on both sides of the VLL service. In some implementations, a single endpoint may be misconfigured without regard to any other endpoint. For example, a configuration information error may arise if a label switched service on a router does not identify an endpoint on the router, without regard to how the router at the other end of the label switched service is configured. Such configuration errors represent conflicts in the switched label service that cause the service not to function properly or to otherwise present incorrect information to the network (e.g., a VLL name mismatch between the two endpoints of the VLL service).

Figure 1:
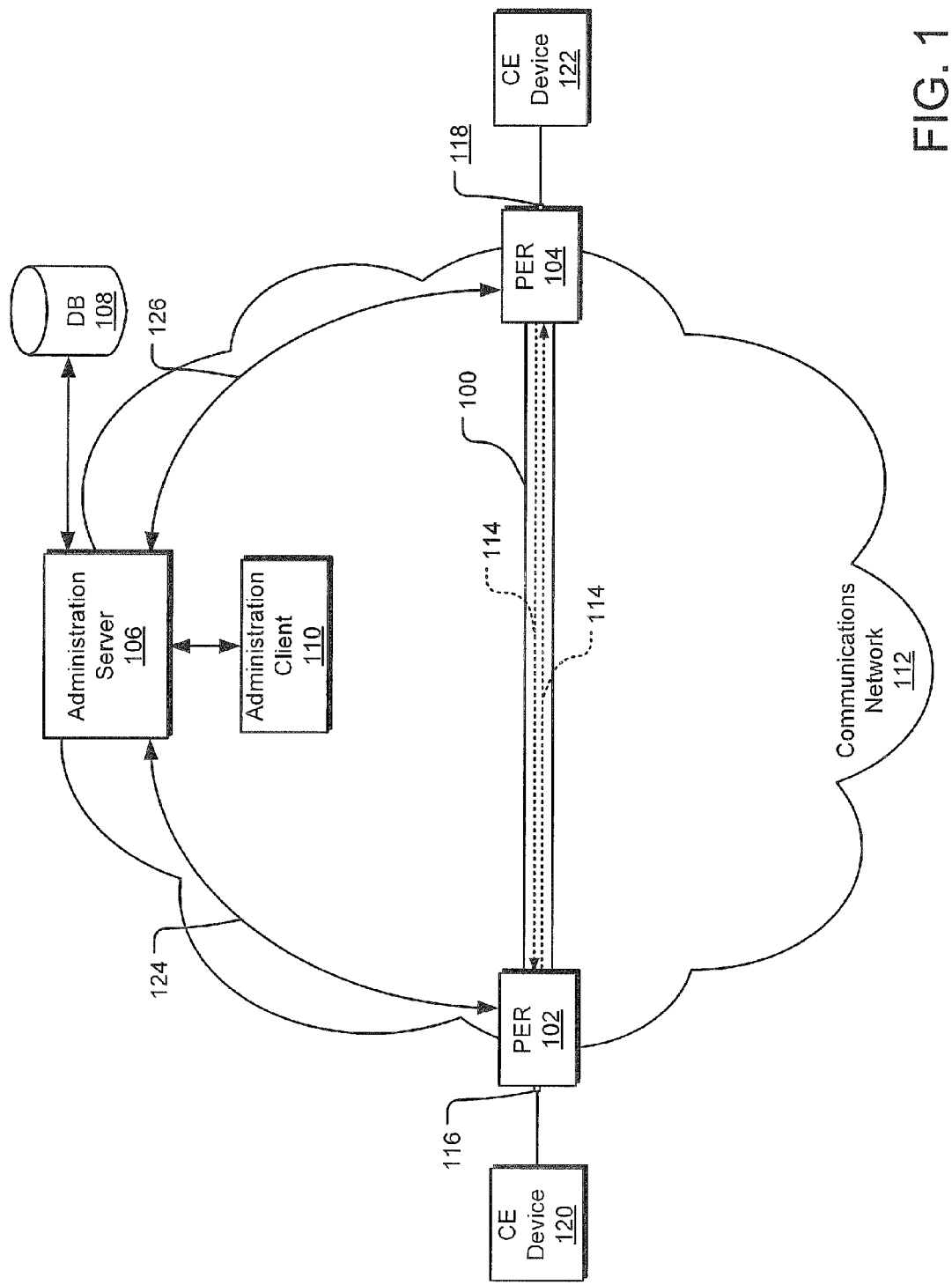
FIG. 1 illustrates a VC in a VLL service between two provider edge routers managed by an example administration server.

FIG. 1 illustrates a virtual circuit or pseudo wire 100 in a VLL service between two provider edge routers (PERs) 102 and 104 managed by an example administration server 106, which can include administrative logic and more particularly conflict identification logic. Generally, a virtual circuit is a logical circuit or path between points in a network that appears to be a discrete, physical path but is actually a managed pool of circuit resources from which specific circuits are allocated as needed to meet traffic requirements. In label switched services, the virtual circuit is commonly referred to as a "pseudo wire".

The administration server 106, which includes administrative logic, is coupled to an administration database (DB) 108, whether directly or through a network, which stores, among other information, configuration information about the VLL service and the PERs 102 and 104. The administration server 106 is accessible by an administration client computer 110, which can issue commands and send data to the administrative server 106 and receive responses from the administration server 106. As illustrated, the PERs 102 and 104, the administration server 106, and the administration client computer 110 are connected through a communications network 112, although the administration server 106 and administration client computer 110 may be embodied in the same computing system or distributed via other means. It should also be understood that the administration server 106 may be implemented in a cluster of multiple individual server systems, wherein the cluster acts like one administrative entity.

In the illustrated implementation, communications in the pseudo wire 100 are performed through two unidirectional targeted LDP sessions 114 between two ports of the PERs 102 and 104. The PERs 102 and 104 include endpoints 116 and 118 of the VLL 100, respectively. Each endpoint 116 and 118 logically resides at a port of a PER and connects to one of the consumer edge devices 120 and 122 (e.g., a router), respectively, to provide connectivity between the consumer's subnets.

Under direction of the administration client computer 110, the administration server 106 can query (e.g., via communication arrows 124 and 126) the services provided by the PERs 102 and 104 on the communications network 112 to collect configuration information about each service supported in the communications network 112. The administration server 106 receives the configuration information from each PER 102 and 104 in response to its queries and stores the received configuration information in memory for analysis. Generally, the memory may be embodied by RAM-type devices in the administration server 106, the database 108, or other storage. The administration server 106 analyzes the configuration information received from each PER 102 and 104 to identify configuration information errors (e.g., conflicts) in each individual PER or between the two PERs. Examples of configuration information errors and analyses used to identify such errors are provided below. If a conflict is detected, then the administration server 106 can generate a notification message identifying the conflict, misconfigured service, and send it to the administrative client computer 110, which can display information identifying the conflict, misconfigured service, etc. The label switched services are displayed on the administration client computer 110, along with an identification and/or description of the detected configuration information errors.

In some implementations, the administration client computer 110 also provides a mechanism for resolving the detected information errors (e.g., through a user interface provided by the administration client computer 110). For example, the administrative server 106 can execute a script to open a command line interface on one of the routers and execute commands to change the misconfigured configuration information.

Figure 2:
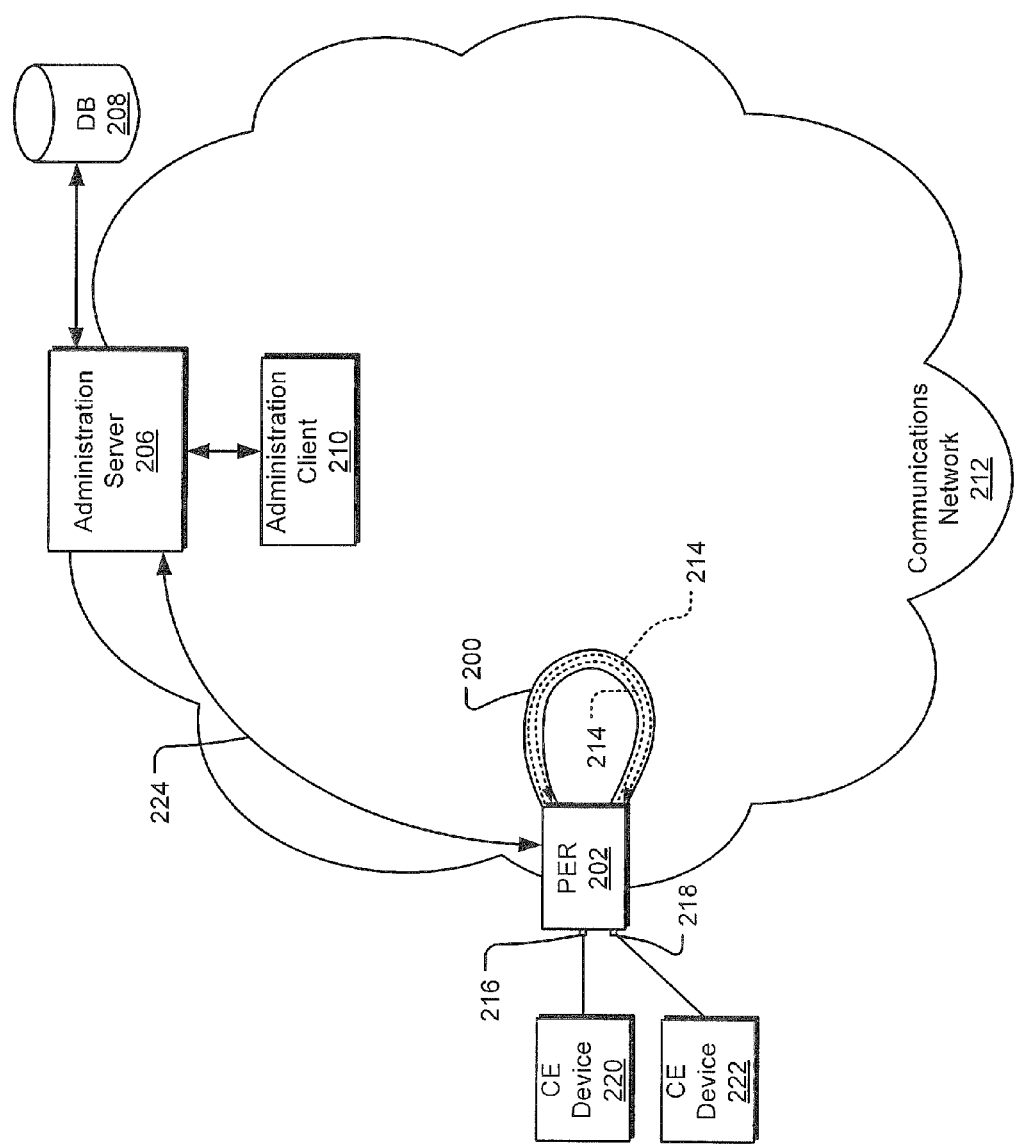
FIG. 2 illustrates a local-VLL service at a provider edge router managed by an example administration server.

FIG. 2 illustrates a local-VLL service at a provider edge router 202 managed by an example administration server 206. The administration server 206 is coupled to an administration database (DB) 208, whether directly or through a network, which stores, among other information, configuration information about the local-VLL service and PER 202. The administration server 206 is accessible by an administration client computer 210, which can issue commands and send data to the administrative server 206 and receive responses from the administration server 206. As illustrated, the PER 202, the administration server 206, and the administrative client computer 210 are connected through a communications network 212, although the administration server 206 and administration client computer 210 may be embodied in the same computing system or distributed via other means.

In the illustrated implementation, communications in the local-VLL service are performed through a bidirectional pseudo wire 200 (including two unidirectional targeted LDP sessions 214) between different ports of the PER 202. The PER 202 includes two endpoints 216 and 218 of the local-VLL service. The extent of the local-VLL service resides within the PER 202, even though the VC 200 is illustrated outside the PER 202. Each endpoint 216 and 218 logically resides at a port of the PER 202 and connects to one of the consumer edge devices 220 and 222 (e.g., a router), respectively, to provide connectivity between the consumer's subnets.

Under direction of the administration client computer 210, the administration server 206 can query (e.g., via communication arrow 224) the services provided by the PER 202 on the communications network 212 to collect configuration information about each label switched service supported in the communications network 212. The administration server 206 receives the configuration information from the PER 202 in response to its queries and stores the received configuration information in memory for analysis. The administration server 206 analyzes the configuration information received from the PER 202 to identify configuration information errors (e.g., conflicts). Examples of configuration information errors and analyses used to identify such errors are provided below. If a conflict is detected, then the administration server 206 can generate a notification message identifying the conflict, misconfigured service, and send it to the administrative client computer 210, which can display information identifying the conflict, misconfigured service, etc. The label switched services are displayed on the administration client computer 210, along with an identification and/or description of the detected configuration information errors.

In some implementations, the administration client computer 210 also provides a mechanism for resolving the detected information errors (e.g., through a user interface provided by the administration client computer 210). For example, the administrative server 206 can execute a script to open a command line interface on one of the routers and execute commands to change the misconfigured configuration information.

Figure 3:
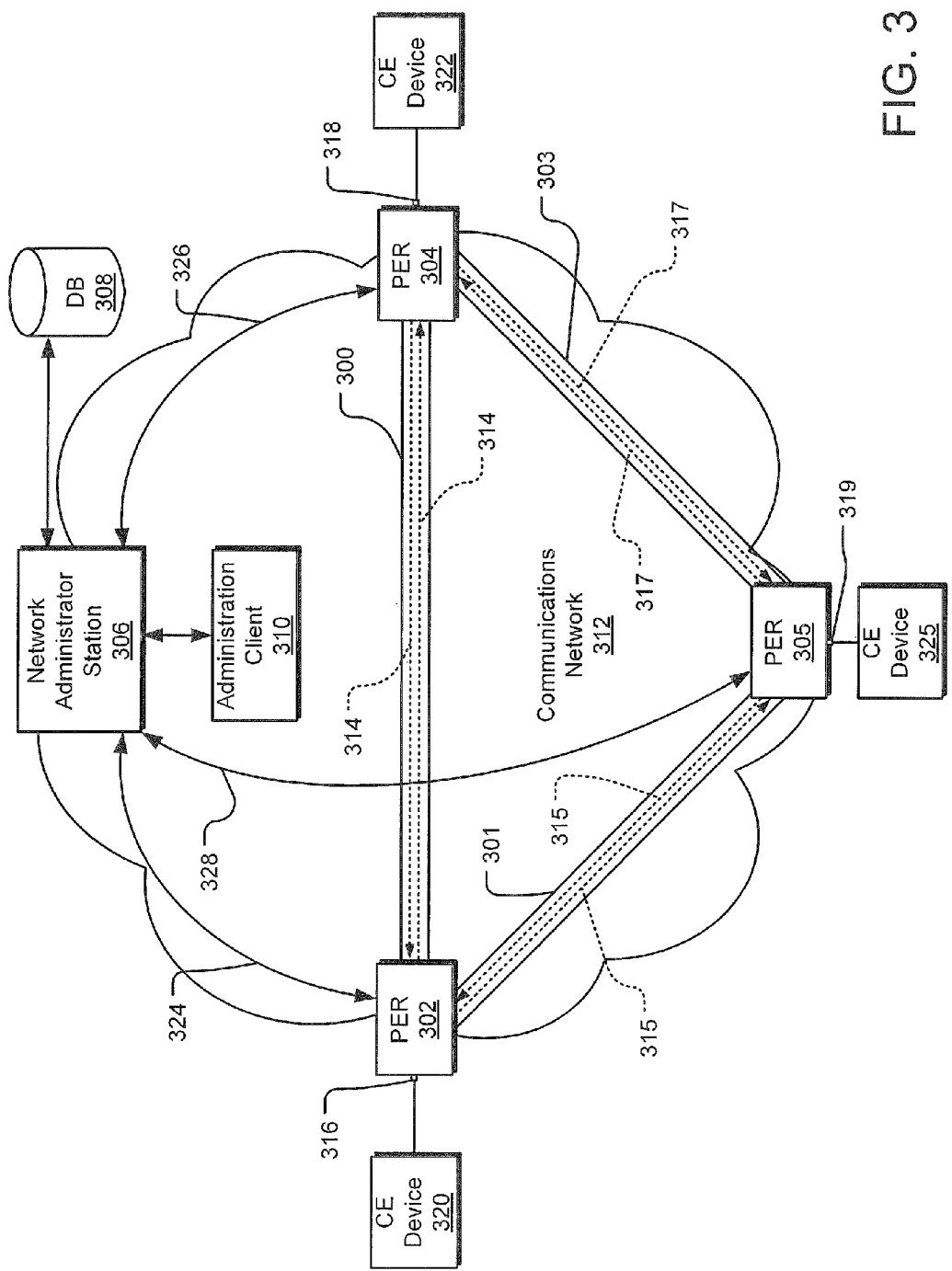
FIG. 3 illustrates VCs in a VPLS service among three provider edge routers managed by an example administration server.

FIG. 3 illustrates pseudo wires 300, 301, and 303 in a VPLS service among three provider edge routers 302, 304, and 305 managed by an example administration server 306. The administration server 306 is coupled to an administration database (DB) 308, whether directly or through a network, which stores, among other information, configuration information about the VPLS service and the PERs 302, 304, and 305. The administration server 306 is accessible by an administration client computer 310, which can issue commands and send data to the administrative server 306 and receive responses from the administration server 306. As illustrated, the PERs 302, 304, and 305, the administration server 306, and the administrative client computer 310 are connected through a communications network 312, although the administration server 306 and administration client computer 310 may be embodied in the same computing system or distributed via other means.

In the illustrated implementation, communications in the VPLS service are performed through the pseudo wire 300 (including two unidirectional targeted LDP sessions 314) between two ports of the PERs 302 and 304, the pseudo wire 301 (including two unidirectional targeted LDP sessions 315) between two ports of the PERs 302 and 305, and the pseudo wire 303 (including two unidirectional targeted LDP sessions 317) between two ports of the PERs 304 and 305. The PERs 302 and 304 include endpoints 316 and 318 of the pseudo wire 300, respectively. The PERs 302 and 305 include endpoints 316 and 319 of the pseudo wire 301, respectively. The PERs 304 and 305 include endpoints 318 and 319 of the pseudo wire 303, respectively. Each endpoint 316, 318, and 319 logically resides at a port of a PER and connects to one of the consumer edge devices 320, 322, or 325 (e.g., routers), respectively, to provide connectivity between the consumer's subnets. It should be understood that each PER may include multiple endpoints for the same VPLS service.

Under direction of the administration client computer 310, the administration server 306 can query the services provided by provider edge devices on the communications network 312 to obtain configuration information about each service supported in the communications network 312. In particular, the administration server 306 queries (via communication arrows 324, 326, and 328) the PERs 302, 304, and 305 to collect configuration information about the label switched services each supports. The administration server 306 receives the configuration information from each PER 302, 304, and 305 in response to its queries and stores the received configuration information in memory for analysis. The administration server 306 analyzes the configuration information received from each PER 302, 304, and 305 to identify configuration information errors (e.g., conflicts) in each individual PER or between the two PERs. Examples of configuration information errors and analyses used to identify such errors are provided below. If a conflict is detected, then the administration server 306 can generate a notification message identifying the conflict, misconfigured service, and send it to the administrative client computer 310, which can display information identifying the conflict, misconfigured service, etc. The label switched services are displayed on the administration client computer 310, along with an identification and/or description of the detected configuration information errors.

In some implementations, the administration client computer 310 also provides a mechanism for resolving the detected information errors (e.g., through a user interface provided by the administration client computer 310). For example, the administrative server 306 can execute a script to open a command line interface on one of the routers and execute commands to change the misconfigured configuration information.

Figure 4:
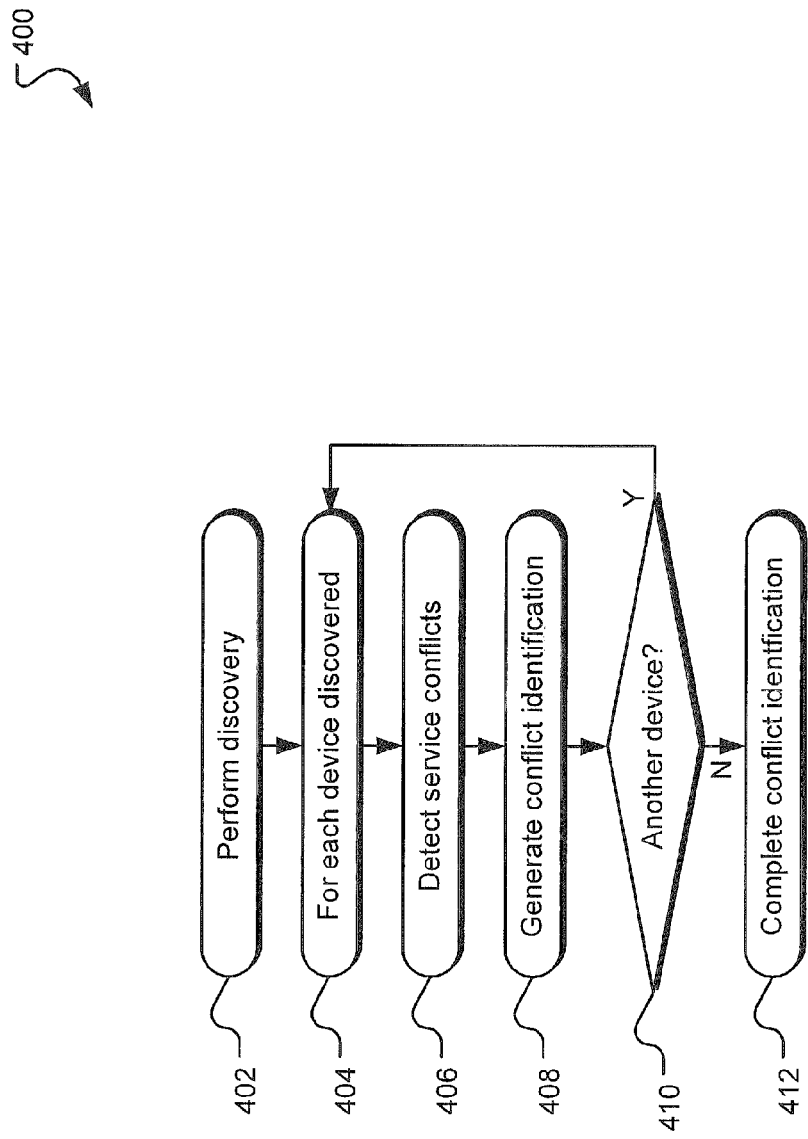
FIG. 4 illustrates example operations for identifying one or more conflicts in configuration of a VLL, a local-VLL, or a VPLS service.

FIG. 4 illustrates example operations 400 for identifying one or more conflicts in configuration of a VLL, local-VLL, or VPLS service. A discovery operation 402 scans the network to identify the devices attached within the network and the services provided by those devices. Discovery may use information from Domain Name Servers (DNSs), information stored in a Dynamic Host Configuration Protocol (DHCP) database, information obtained through multicast queries throughout the network, etc. In one implementation, Simple Network Management Protocol (SNMP) discovery is employed to discover the PERs, services, and their respective configuration information. In yet another implementation, a Layer 2 discovery protocol provides communication specifications for allowing network devices to provide configuration information to other devices in the network. Using such a protocol, for example, the discovery operation 402 can receive configuration information pertaining to devices on the network and the services provided by those devices, although other implementations may be employed.

A device looping operation 404 iterates through each discovered device on the network. For each device, a detection operation 406 detects conflicts in the various services supported by the current device. In one implementation, a conflict may represent a configuration information error in the configuration information of a single device (e.g., no endpoints in a VLL service of the current device) or a configuration information error in the configuration information of multiple devices (e.g., the VLL mode of the current device does not match the VLL mode of its peer device). An identification operation 408 identifies the conflict. For example, an administration server, having compared the VLL modes of two routers at either end of a VLL service, detects a mismatch in the detecting operation 406. Accordingly, the administration server sends (in the identification operation 408) information to an administration client to display an identification of the faulty VLL service and a description of the detected conflict (e.g., "VLL MODE MISMATCH").

A decision operation 410 determines whether any additional devices are available for an attempt at conflict identification. If so, processing proceeds to the device looping operation 404. Otherwise, a termination operation 412 completes the conflict identification process.

Based on the conflict identification, the administrative logic can also be used to resolve the conflicts in some circumstances. For example, if a name or mode mismatch is detected, then a user can select the proper name or mode and instruct the administrative logic to change the name or mode at one of the PERs. For example, if the VLL mode in PER A for a particular service is different than the VLL mode in PER B for that service, then the user can instruct the administrative logic to change the VLL mode in one of the PERs to match the other. In one implementation, the administrative logic can execute a script to open a command line interface (CLI) into one of the routers and then execute a command to change the VLL mode in that router. Other operations for resolving conflicts may also be employed.

Figure 5:
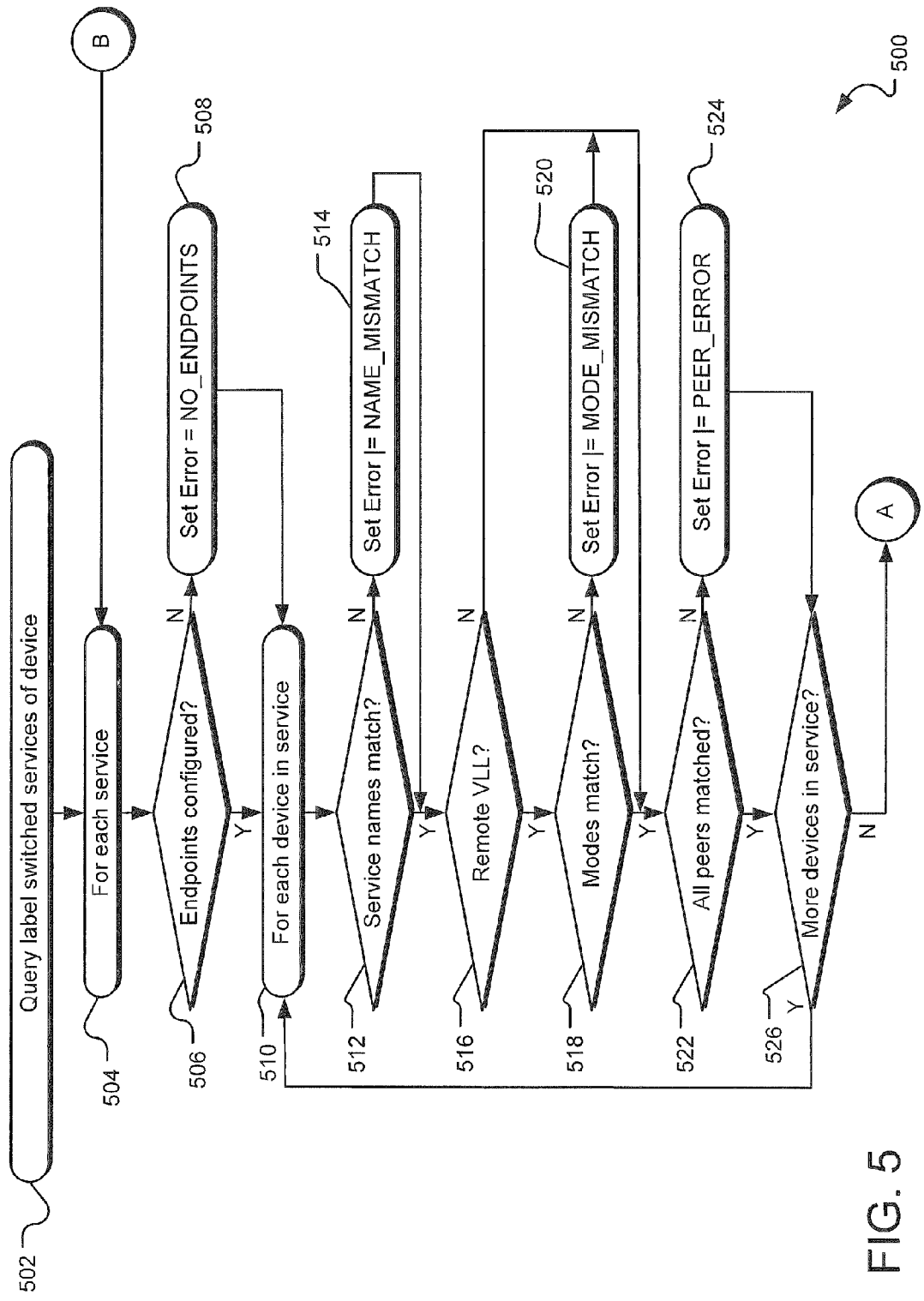
FIG. 5 illustrates detailed example operations for identifying a conflict in a network.

FIG. 5 illustrates detailed example operations 500 for identifying a conflict in a network. A query operation 502 identifies each label switched service provided by a discovered network device. In one implementation, the configuration information of the detected network devices is stored in memory and queried (e.g., a database query, a parsing and lexical analysis, etc.) in the query operation 502 to identify the label switched services supported by the device. Typically, an initial value of an error parameter is undefined. In one implementation, the error parameter is a binary value, where each error type is represented by a specific one of the bit locations (e.g., NO_CONFLICTS=0x00000000, NO_ENDPOINTS=0x00000001, MODE_MISMATCH= 0x00000010, etc.), although other formatting may be employed. Using the error parameter, multiple error types can be recorded and communicated in a single value.

A service looping operation 504 iterates through each of the identified services. A decision operation 506 determines whether any endpoints have been configured for the current label switched service. If not, a setting operation 512 sets the error parameter to NO_ENDPOINTS to indicate that the current service is misconfigured based on a type of conflict indicating the absence of endpoints for the service.

Processing proceeds to a device looping operation 510, which iterates through each peer device associated with the current service. A decision operation 512 determines whether the service names (typically used as a mnemonic identifier provided and used by the administrator to identify a specific label switched service) match. If not, a setting operation 514 adds (e.g., via Boolean OR operation) a NAME_MISMATCH value to the error parameter.

Processing proceeds to a decision operation 516, which determines whether the service is a remote VLL service (i.e., not a local-VLL or VPLS service). If not, processing proceeds to a decision operation 522. Otherwise, another decision operation 518 determines whether the mode names of the one or more peers associated with the service match. If not, a setting operation 520 adds a MODE_MISMATCH value to the error parameter, and processing proceeds to the decision operation 522.

The decision operation 522 determines whether all of the peers on the service are matched. In one implementation, there are at least two situations that can fail this condition. In one part of the test, the current device and its peer(s) indicate that a peer is missing from their mutual configurations. For example, if there are three PERs (A, B, and C) connected by pseudo wires in a VPLS service, the configuration information for the associated label switched service on PER A may identify its peers as PERs B and C and the configuration information for the associated label switched service on PER B may identify its peers as PERs A and C. However, if there is no configuration information for the associated label switched service on PER C, then the service is deemed to have a "missing peer" conflict. In the illustrated process, a setting operation 524 adds a PEER_ERRROR value to the error parameter, although in other implementations, the value may be more specific so as to identify that the peer error involves a missing peer.

In another part of the test, the current device and its peer(s) indicate that at least one unidirectional connection is missing from the configuration information among the endpoints of a label switched service. Such unidirectional connections are termed "targeted LDP sessions," where LDP stands for "label distribution protocol". Each PER in a VLL service sets a targeted LDP session with another PER, a PER in a local-VLL service sets up a targeted LDP session with itself, and each PER in a VPLS service sets up targeted LDP sessions with all of the other PERs in the same VPLS service. If one of the PERs in one of these services fails to set up a targeted LDP session, then the connections in the VLL service, local-VLL service, or VPLS service is not considered operable.

For example, if there are three PERs (A, B, and C) connected by pseudo wires, the configuration information for the associated label switched service on PER A may identify targeted LDP sessions with both PERs B and C, and the configuration information for the associated label switched service on PER B may identify targeted LDP session with both PERs A and C. However, if the configuration information for the associated label switched service on PER C only identifies a targeted LDP session with PER A and not with PER B, then the service is deemed to have an "incomplete peer" conflict. In the illustrated process, a setting operation 524 adds a PEER_ERROR value to the error parameter, although in other implementations, the value may be more specific so as to identify that the peer error involves an incomplete configuration of a peer (as opposed to a missing peer).

Figure 6:
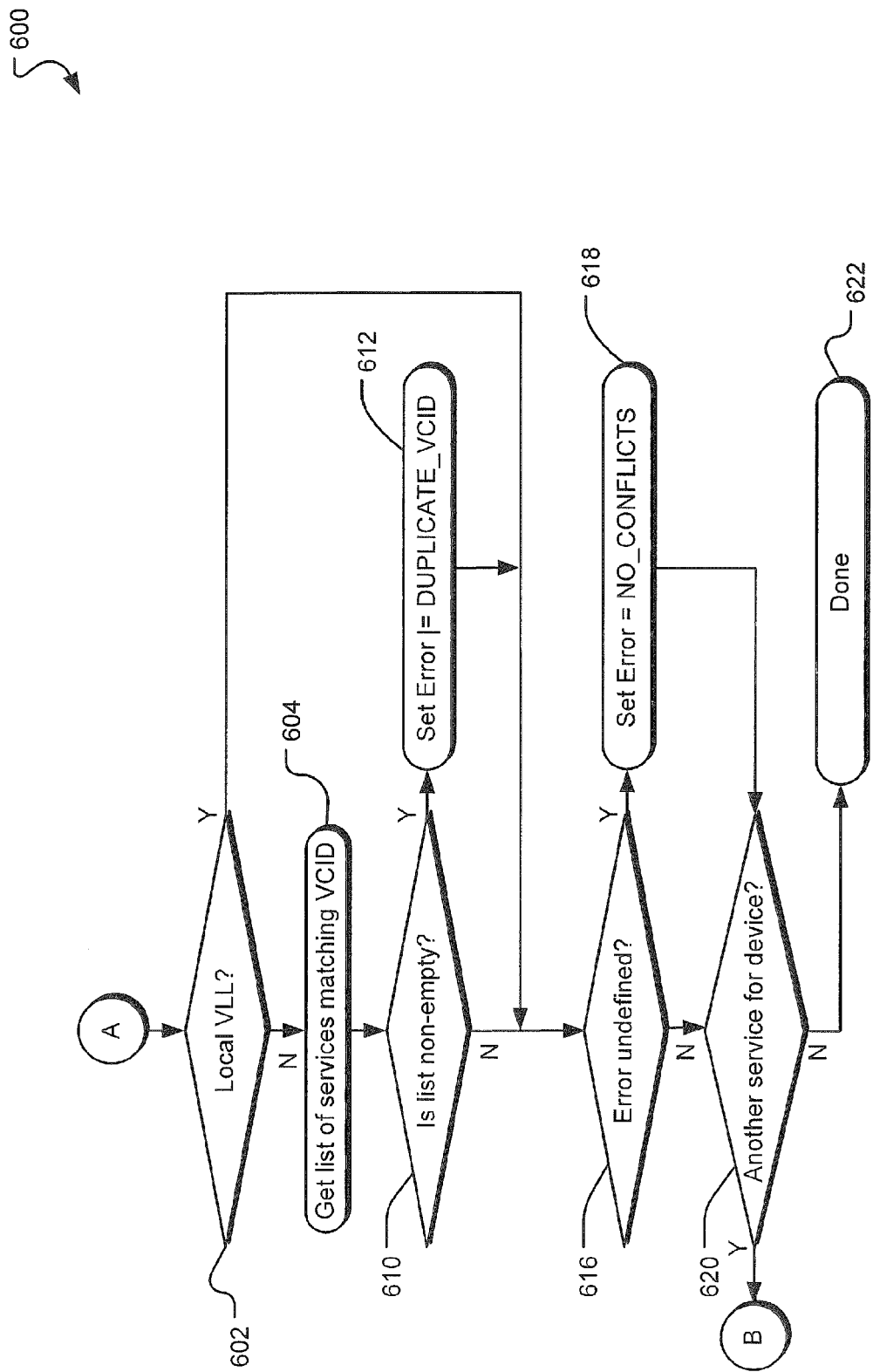
FIG. 6 illustrates additional detailed example operations for identifying a conflict in a network.

Processing proceeds to a decision operation 526, which determines whether there is an additional device identified in associated with the service. If so, processing proceeds to the device looping operation 510 and continues. Otherwise, processing proceeds through link A to FIG. 6 where another decision operation 602 determines whether the service is a local-VLL service. If so, processing skips duplicate VCID detection operations 604, 610, 612 and proceeds to a decision operation 616, which determines any conflicts have been determined yet for the current service.

If the current service is determined not to be a local-VLL service in the decision operation 602, then a discovery operation 604 obtains a list of services (e.g., defined by stored configuration information administered by the administrative logic) that matches the virtual circuit or virtual connection identifier (VCID) associated with the current service of the service looping operation 504 from FIG. 5. If this list is non-empty (as determined by a decision operation 610), then multiple services defined in the stored configuration information are found to have the same VCID, and a setting operation 612 adds a DUPLICATE_VCID value to the error parameter of the current service of the service looping operation 504 of FIG. 5.

Proceeds to a decision operation 616, which determines whether any conflicts have been determined yet for the current service. If this condition is met, then a setting operation 618 sets the error parameter to NO_CONFLICTS. Processing proceeds at decision operation 620, which determines whether any additional services are provided by the current device. If so, processing proceeds through link B to FIG. 5 and continues with the service looping operation 504. Otherwise, processing terminates at operation 622.

In the end, the illustrated process detects one or more configuration error types or the lack thereof, which constitutes a configuration error state. The administration server can then generate and send a notification message identifying the configuration error state to an administration client computer or other display system, which can identify the configuration error state to the user.

Figure 7:
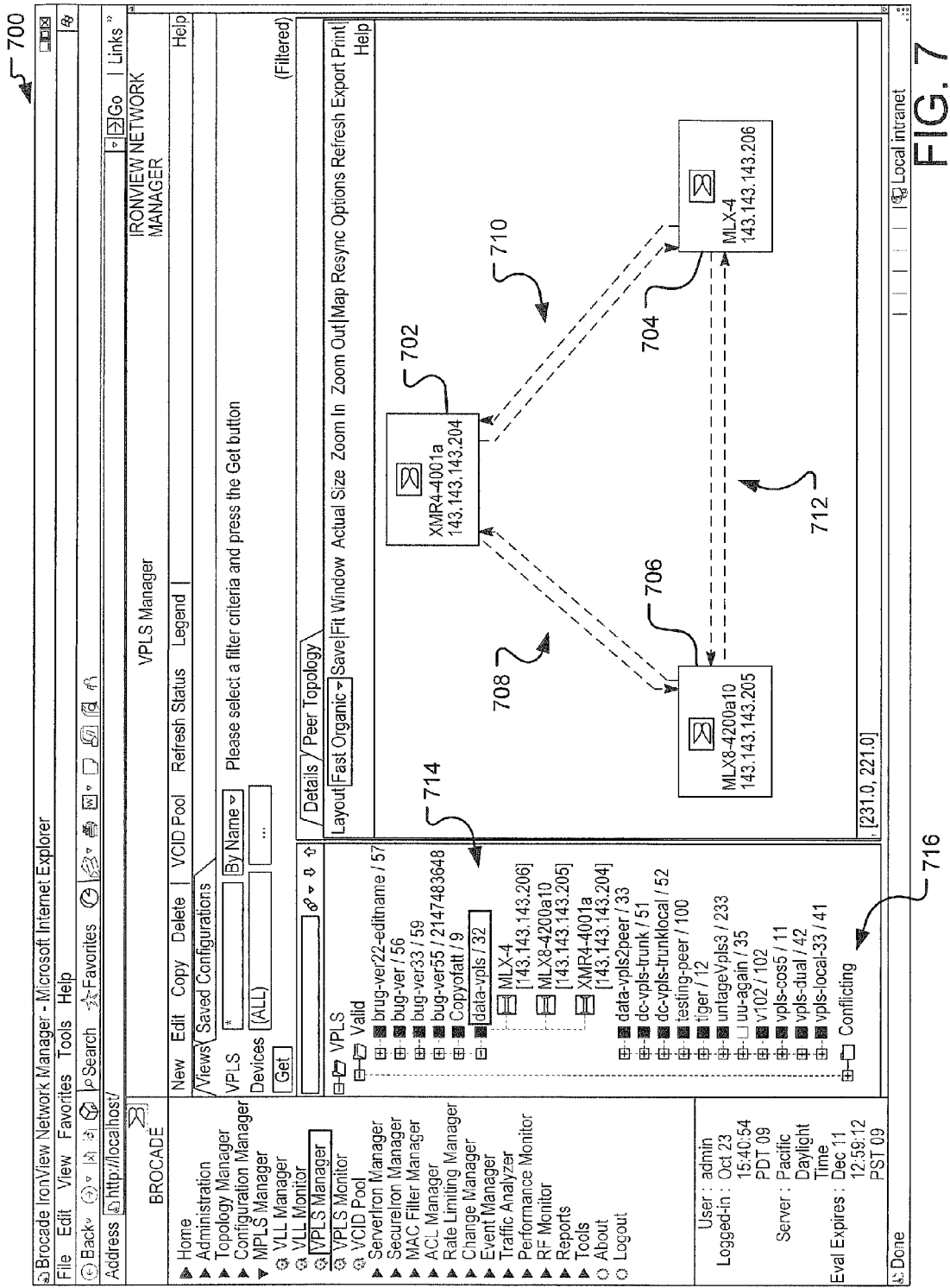
FIG. 7 illustrates an example screenshot illustrating a portion of a network topology in a VPLS environment.

FIG. 7 illustrates an example screenshot 700 illustrating a portion of a network topology in a VPLS environment. Such a screenshot may be displayed on an administration client computer associated with the network. The screenshot 700 shows three PERs 702, 704, and 706 connected by pseudo wires 708, 710, and 712 in a VPLS service. The label switched service is marked as Valid in the VPLS tree at 714 and is identified as "data-vpls," with a VCID of "32". Under the "data-vpls" entry, the three PERs, MLX-4, MLX8-4200a10, and XMR4-4001a, are listed with their IP addresses. Being listed under the "Valid" portion 714 of the VPLS tree, the configuration of the service "data-vpls" is indicated as valid. In contrast, other misconfigured may be listed under the "Conflicting" portion 716 of the VPLS tree. The tree view interface can be used to review and filter certain pseudo wires and/or devices.

Figure 8:
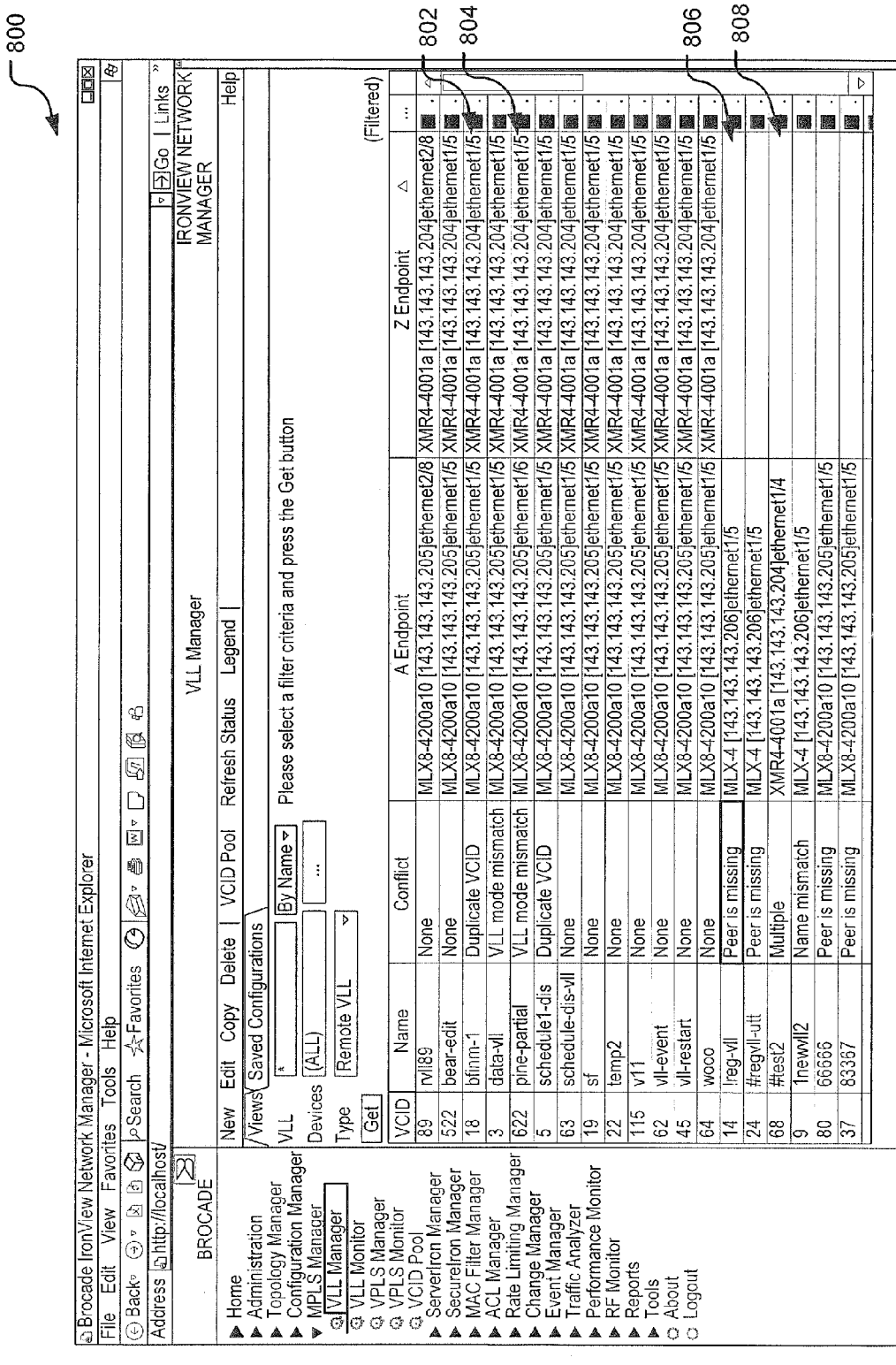
FIG. 8 illustrates an example screenshot of an administrative station identifying a conflict in a label switched service.

FIG. 8 illustrates an example screenshot 800 of an administrative station identifying a conflict in a label switched service. In the illustrated list view screenshot 800, several services are indicated as having conflicts, such as "Duplicate VCID" conflict 802, "VLL mode mismatch" conflict 804, "Peer is missing" conflict 806, and "Multiple" conflict 808. The conflicts 802, 804, and 806 have been previously discussed in detail. The "Multiple" conflict 808 indicates that two or more of the supported conflicts have been identified.

In one implementation, the screenshot 800 is displayed on an administration client computer (e.g., see administration client computer 110) based on one or more messages sent from an administration server (e.g., see administration server 106). The administration server executes a conflict identification process (such as the processes illustrated in FIGS. 4-6) to generate a conflict identification for one or more label switched services. It should be understood that the conflict identification process may alternatively be executed on the administration client computer, on a network-attached appliance, on individual routers or switches, etc.

Figure 9:
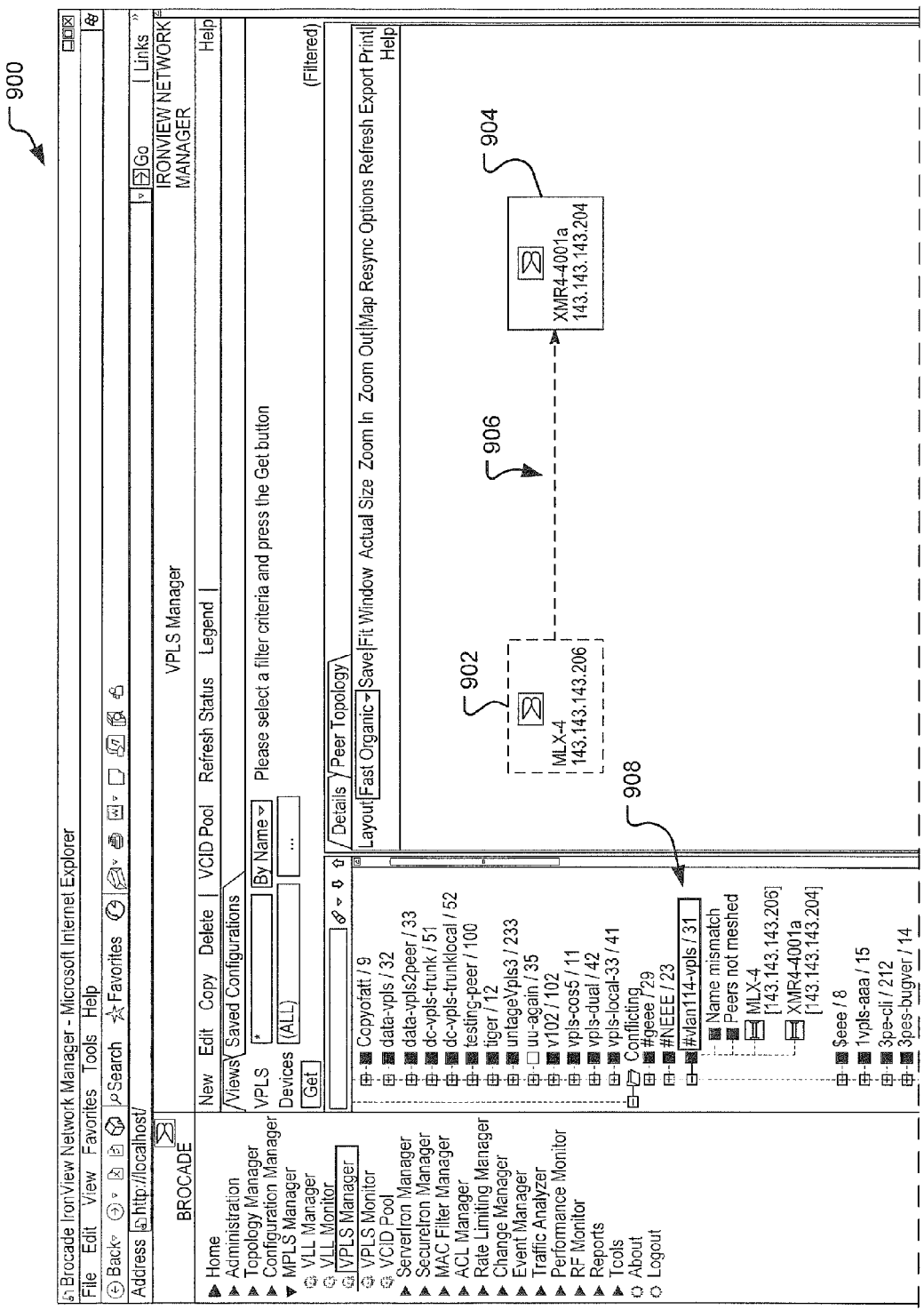
FIG. 9 illustrates an example screenshot of an administrative station depicting a conflict in a network topology of a VPLS service.
Figure 9:
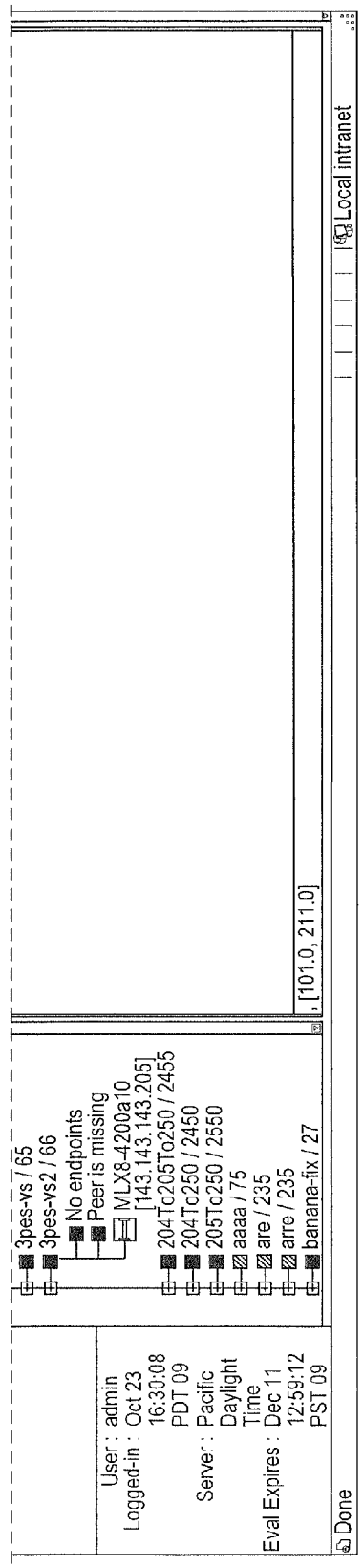

FIG. 9 illustrates an example screenshot 900 of an administrative station depicting a conflict in a network topology of a VPLS service. The screenshot 900 depicts a portion of a network topology containing two routers 902 and 904, which are connected by via a targeted LDP session 906 from PER 902 to PER 904. However, there is no targeted LDP session set up from PER 904 to PER 902. As such, the portion 908 of the tree relating to service #vlan114-vpls indicates a PEER_ERROR (displayed as "Peers not meshed") under the "Conflicting" branch of the tree. The portion 908 also illustrates another conflict: "Name mismatch," indicating that the VPLS names between the two PERs 902 and 904 do not match.

Figure 10:
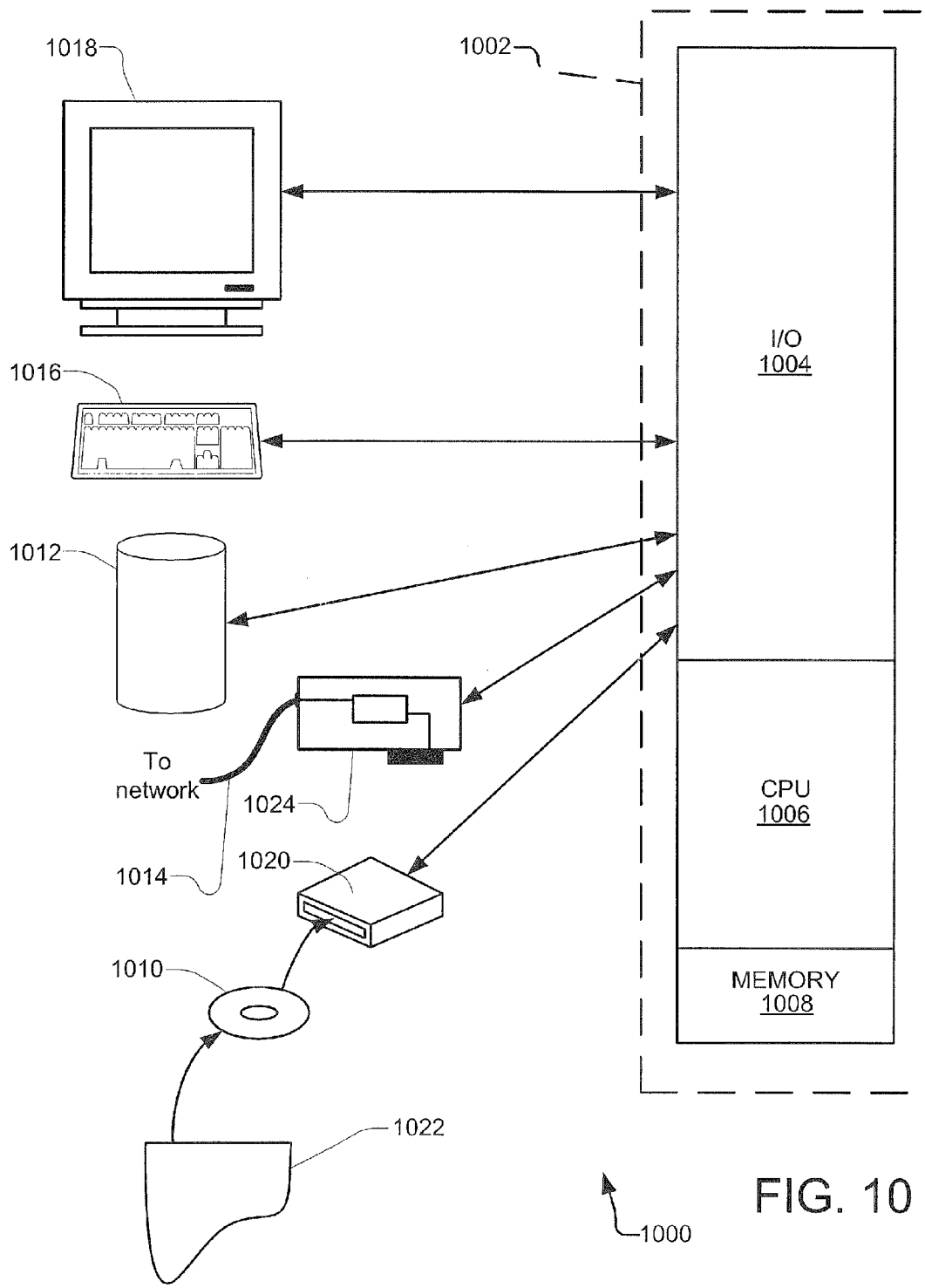
FIG. 10 illustrates an example computing system that can be used to implement the presently disclosed technology.

FIG. 10 illustrates an example computing system that can be used to implement the described technology. A general purpose computer system 1000 is capable of executing a computer program product to execute a computer process. Data and program files may be input to the computer system 1000, which reads the files and executes the programs therein. Some of the elements of a general purpose computer system 1000 are shown in FIG. 10 wherein a processor 1002 is shown having an input/output (I/O) section 1004, a Central Processing Unit (CPU) 1006, and a memory section 1008. There may be one or more processors 1002, such that the processor 1002 of the computer system 1000 comprises a single central-processing unit 1006, or a plurality of processing units, commonly referred to as a parallel processing environment. The computer system 1000 may be a conventional computer, a distributed computer, or any other type of computer. The described technology is optionally implemented in software devices loaded in memory 1008, stored on a configured DVD/CD-ROM 1010 or storage unit 1012, and/or communicated via a wired or wireless network link 1014 on a carrier signal, thereby transforming the computer system 1000 in FIG. 10 to a special purpose machine for implementing the described operations.

The I/O section 1004 is connected to one or more user-interface devices (e.g., a keyboard 1016 and a display unit 1018), a disk storage unit 1012, and a disk drive unit 1020. Generally, in contemporary systems, the disk drive unit 1020 is a DVD/CD-ROM drive unit capable of reading the DVD/CD-ROM medium 1010, which typically contains programs and data 1022. Computer program products containing mechanisms to effectuate the systems and methods in accordance with the described technology may reside in the memory section 1004, on a disk storage unit 1012, or on the DVD/CD-ROM medium 1010 of such a system 1000. Alternatively, a disk drive unit 1020 may be replaced or supplemented by a floppy drive unit, a tape drive unit, or other storage medium drive unit. The network adapter 1024 is capable of connecting the computer system to a network via the network link 1014, through which the computer system can receive instructions and data embodied in a carrier wave. Examples of such systems include Intel and PowerPC systems offered by Apple Computer, Inc., personal computers offered by Dell Corporation and by other manufacturers of Intel-compatible personal computers, AMD-based computing systems and other systems running a Windows-based, UNIX-based, or other operating system. It should be understood that computing systems may also embody devices such as Personal Digital Assistants (PDAs), mobile phones, gaming consoles, set top boxes, etc.

When used in a LAN-networking environment, the computer system 1000 is connected (by wired connection or wirelessly) to a local network through the network interface or adapter 1024, which is one type of communications device. When used in a WAN-networking environment, the computer system 1000 typically includes a modem, a network adapter, or any other type of communications device for establishing communications over the wide area network. In a networked environment, program modules depicted relative to the computer system 1000 or portions thereof, may be stored in a remote memory storage device. It is appreciated that the network connections shown are exemplary and other means of and communications devices for establishing a communications link between the computers may be used.

In an example implementation, conflict identification logic may be incorporated in administrative logic managing a network as part of the operating system, application programs, or other program modules. In various implementations, the administrative logic and conflict identification logic may be incorporated as hardware, software, or a combination thereof in various client computers, server computers, or combinations there, whether local or distributed. An administration database may be stored as program data in memory 1008 or other storage systems, such as disk storage unit 1012 or DVD/CD-ROM medium 1010. As previously discussed, the computing system 1000 may be distributed in a cluster of multiple computing devices to act as a single administrative entity.

It should be understand that circuitry and/or program instructions in one or more switches, one or more administrative workstations, various combinations of one or more switches and one or more workstations, and other computing system implementations may represent example embodiments of the technology described herein.

The implementations of the presently disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the presently disclosed technology. Accordingly, the logical operations making up the implementations of the presently disclosed technology described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example implementations of the presently disclosed technology. Since many implementations of the presently disclosed technology can be made without departing from the spirit and scope of the presently disclosed technology, the presently disclosed technology resides in the claims hereinafter appended. Furthermore, structural features of the different implementations may be combined in yet another implementation without departing from the recited claims.

What is claimed is:

1. A non-transitory computer-readable storage media storing computer-readable instructions for executing a method on a computer system, the method comprising:
    storing into memory configuration information of one or more virtual leased line services;
    detecting a configuration information error state associated with a service based on the stored configuration information, wherein the configuration information error state corresponds to one or more of: missing endpoint, service name, service mode, and service peering;
    wherein the configuration information error state corresponding to service peering includes incomplete configuration in the configuration information of at least one virtual leased line service peer; and
    generating a notification identifying the virtual leased line service associated with the configuration information error state.

2. The computer-readable storage media of claim 1, wherein the generating operation further generates a notification that identifies one or more error types associated with the configuration information error state.

3. The computer-readable storage media of claim 1, wherein the detecting operation comprises:
    detecting a mismatch between stored configuration information of a first router and stored configuration information of a second router associated with the virtual leased line service.

4. The computer-readable storage media of claim 1, wherein the configuration information error state corresponding to service peering comprises:
    a conflict indicating that stored configuration information of a first router associated with the virtual leased line service does not identify a targeted label distribution protocol session for a peer router associated with the virtual leased line service.

5. The computer-readable storage media of claim 1, wherein stored configuration information of a first router identifies a second router as a peer of the first router for the virtual leased line service.

6. The computer-readable storage media of claim 1, wherein the detecting operation comprises:
    detecting that stored configuration information of a first router identifies a virtual circuit identifier for the virtual leased line service that matches a virtual circuit identifier in stored configuration information associated with a second virtual leased line service, wherein a second router supports the second virtual leased line service, as identified by the stored configuration information of the second router.

7. The computer-readable storage media of claim 1, wherein the detected configuration information error state corresponds to a misconfiguration of a first router associated with the virtual leased line service without regard to how other routers associated with the virtual leased line service are configured.

8. A method, comprising:
    storing into memory configuration information of one or more virtual leased line services;
    detecting a configuration information error state associated with a service based on the stored configuration information, wherein the configuration information error state corresponds to one or more of: missing endpoint, service name, service mode, and service peering;
    wherein the configuration information error state corresponding to service peering includes incomplete configuration in the configuration information of at least one virtual leased line service peer; and
    generating a notification identifying the virtual leased line service associated with the configuration information error state.

9. The method of claim 8, wherein the generating operation further generates a notification that identifies one or more error types associated with the configuration information error state.

10. The method of claim 8, wherein the detecting operation comprises:
    detecting a mismatch between stored configuration information of a first router and stored configuration information of a second router associated with the virtual leased line service.

11. The method of claim 8, wherein the configuration information error state corresponding to service peering comprises:
    a conflict indicating that stored configuration information of a first router associated with the virtual leased line service does not identify a targeted label distribution protocol session for a peer router associated with the virtual leased line service.

12. The method of claim 8, wherein stored configuration information of a first router identifies a second router as a peer of the first router for the virtual leased line service.

13. The method of claim 8, wherein the detecting operation comprises:
    detecting that stored configuration information of a first router identifies a virtual circuit identifier for the virtual leased line service that matches a virtual circuit identifier in stored configuration information associated with a second virtual leased line service, wherein a second router supports the second virtual leased line service, as identified by the stored configuration information of the second router.

14. The method of claim 8, further comprising detecting the configuration information error state due to a misconfiguration of a first router associated with the virtual leased line service without regard to how other routers associated with the virtual leased line service are configured.

15. A computing system comprising:
    a non-transitory processor-readable memory; and
    processor-executable conflict identification logic configurable to:

store into memory configuration information of one or more virtual leased line services;

detect a configuration information error state associated with a service based on the stored configuration information, wherein the configuration information error state corresponds to one or more of:

missing endpoint, service name, service mode, and service peering;

wherein the configuration information error state corresponding to service peering includes incomplete configuration in the configuration information of at least one virtual leased line service peer; and generate a notification identifying the virtual leased line service associated with the configuration information error state.

16. The computing system of claim 15, wherein the processor-executable administrative logic is further configurable to detect the configuration information error by detecting a mismatch between stored configuration information of a first router and stored configuration information of a second router associated with the virtual leased line service.

17. The computing system of claim 15, wherein the detected configuration information error state corresponds to a misconfiguration of a first router associated with the virtual leased line service without regard to how other routers associated with the virtual leased line service are configured.

* * * * *